March 4, 1969 H. B. CUMMINGS 3,431,332
CERAMIC CASTING TECHNIQUES
Filed July 16, 1962

INVENTOR.
HOWARD B. CUMMINGS
BY
Ely, Pearne & Gordon
Attorneys 3,431,332
CERAMIC CASTING TECHNIQUES
Howard B. Cummings, New Castle, Pa., assignor, by mesne assignments, to Interface Corporation, Parsippany, N.J., a corporation of Delaware
Filed July 16, 1962, Ser. No. 209,915
U.S. Cl. 264—86
Int. Cl. B28b 1/26
2 Claims This invention relates generally to the art of ceramic casting, and more specifically to casting molds and casting techniques adapted to the production of ceramic objects from clay slips and slurries, the latter of which may be comprised in whole or part of suspended ceramic particles other than clay.

The slip casting of clays to form a wide variety of ceramic objects, such as, for example, dinnerware, artware, sanitary ware, electrical insulators and other so-called electrical porcelains, and various structural or functional parts, has, of course, been practiced for many years; it usually involves the procedure of preparing a suitable slip consisting essentially of a suspension of clay in water and casting the prepared slip into a porous, plaster-of-Paris mold. When forming what is known as a "solid casting," the slip is poured into the mold, usually its center, to fill a closed cavity defined by two or more mold parts meeting at a parting line or lines and water is then removed from the slip next to the plaster mold surfaces by absorption of the water of suspension in the plaster and leaving a deposit of clay in the mold cavity surface. As the volume of slip within the cavity is decreased by the removal of water at the mold surface, additional slip flows into the mold through the sprue. This removal of water continues deeper into the slip with increased time until the cast object is sufficiently solidified, at least at its surface, to be removed from the mold. It has been proposed to apply pressure to the slip to expedite the removal of the water of suspension and the use of pressure is practical in some applications.

Although the foregoing casting procedure has long been commercially practiced by the art, a persistent problem has been to remove the water from the slip with sufficient uniformity to prevent warping and shrinkage cracks during drying and to produce a soundly cast, homogeneous clay body of high strength. This problem arises from the above-discussed mechanism of slip casting which consists of first removing water from the slip next to the porous plaster surfaces which form the entire annular mold cavity. When this occurs, the slip solidifies to form a layer or shell of progressively increasing thickness through which water from the encased slip must be removed. This build-up of an increasingly thicker layer in the mold cavity poses numerous problems. As the thickness of the layer increases, not only does it become increasingly more impenetrable, thus slowing the removal of suspension water, but the increased thickness of deposited clay closes off the passageway for fluid slip to flow within the mold cavity. The solutions to this particular problem have, at best, been an unsatisfactory compromise between two expedients. One expedient is to formulate the slip so that it casts very slowly; this decreases the production rate and increases production costs. The other expedient is to increase the wall thicknesses far beyond that which is required or desired so as to avoid restriction against the flow of the slip between the walls of the cavity; this likewise increases production time and cost of materials and, additionally, often requires that the article be far heavier than desired, increasing shipping, handling, and installation costs of large ceramic products, such as sanitary ware and large electrical insulators. In many instances the use of pressure on the slip may only accentuate the problem of build up adjacent the sprue; also, the use of multiple sprues to decrease the distance of flow within the cavity is usually avoided since the last expedient may create sections or lines of shrinkage and cleavage roughly perpendicular to the wall of the object in addition to the line or surface parallel to the wall surface as explained below.

The result of the above compromise is that so-called solid cast green ware may, at the surface, be at the practically leather-hard stage of solidity and may have commenced to shrink away from the absorptive mold walls (facilitating removal of the cast body) whereas, within the cast body, the clay or other suspended solids are not only still plastic but may actually still be fluid. This condition of a gradient of increased water content from the surface toward the center of the wall of a cast ceramic body most often reveals its undesirable effect by severe and unpredictable warping and shrinkage of the green ware as it is dried for firing. Many pieces of ware develop drying shrinkage cracks that are undetected until they develop to obvious and unrepairable flaws during firing. If detected before firing, the manufacturer has the unhappy choice of recovering, at best, the clay or other ceramic material by destroying the piece and returning it to the blunger for the preparation of a new slip, or, if the piece is very large, of gouging out the cracked portion and repairing by filling the gouged-out hole with still plastic clay which may weld itself in the piece. Such repair is not only time and labor consuming, but is always a gamble; it is not possible to predetermine the depth of the crack, which must be completely removed, nor is it predictable that the repair will hold either during the subsequent drying of the repair or firing.

If the uneven density of the cast clay body does not cause the development, during drying, of complete fractures, cracks, or warping severe enough to cause the piece to be rejected, such defects (attributable to non-uniform variations in the density of the clay in the body as cast) may well develop during firing, in which event the labor, materials and plant capacity involved in producing the piece are lost, for all practical purposes.

Even if the solid clay body survives drying and firing, the consequence of solid casting methods, as heretofore practiced, produces a still further problem. Due to the lesser density or compaction of the clay in the interior of the cast bodies, nearly all have a central line or incipient surface of cleavage at or near the median between opposite wall surfaces in any given section. Whether such cleavage lines exist as actual flaws or mere potential lines of weakness is not detectable until the article fractures in service. Another aspect of this insidious and unpredictable evil is that thickening the wall to provide necessary strength, even at the expense of lightness of weight and economy of material and handling, may often increase the likelihood and seriousness of such internal lines, planes, or surfaces of cleavage.

And, finally, even though a given piece may survive all the foregoing hazards or if the inherent or potential flaws may be immaterial, the casting techniques used heretofore produce ware of only vaguely predictable dimensional stability or uniform shrinkage between the cast green ware and the final fired product. It is this lack which has often been a real drawback to the use of ceramic parts and articles in structures and mechanisms where the relatively low cost of basic ingredients, non-metallic characteristics, hardness, strength, and like characteristics would otherwise render ceramic elements highly desirable. In certain applications where the combination of such characteristics is an essential requisite along with accurate dimensions, the practice is to produce oversize ware and then grind or otherwise machine the ware to requisite size, a highly expensive and slow operation generally used only because no available non-ceramic can perform the requisite functions of the ground or machined ceramic element.

It is an object of this invention to provide a method of casting which eliminates the usual increasing gradients of water content toward the center of the wall of a piece of cast ware and a novel mold structure permitting the formation, by this invention, of a green ceramic body essentially having a single gradient of water content from one surface of the mold to the opposite surface at substantially any given section through the wall or single thickness of the article. The advantages of this invention are many. The dimensional stability and uniformity of shrinkage of duplicate pieces of ware during drying and firing is substantially improved; the cast article may be more uniformly produced to much closer and more dimensional tolerances than heretofore obtainable, often eliminating the need for grinding or otherwise machining to dimension. The internal lines or surfaces of actual or potential cleavage are substantially eliminated. In view of the foregoing achievements, and as a consequence thereof, lighter and stronger ceramic articles may be produced at considerably less expense in labor and materials directly required for a specific article; the substantial minimization of scrapped cast articles, due to the decrease in drying and firing cracks, also greatly decreases the average cost of an article. Still further, conventional clay slips may be cast more quickly and slips or slurries comprised in whole or in part of suspensions of ceramic particles other than clay may be quickly and simply cast.

Other objects and advantages of the invention will be apparent from the following detailed description and the accompanying drawing.

Figure 1:
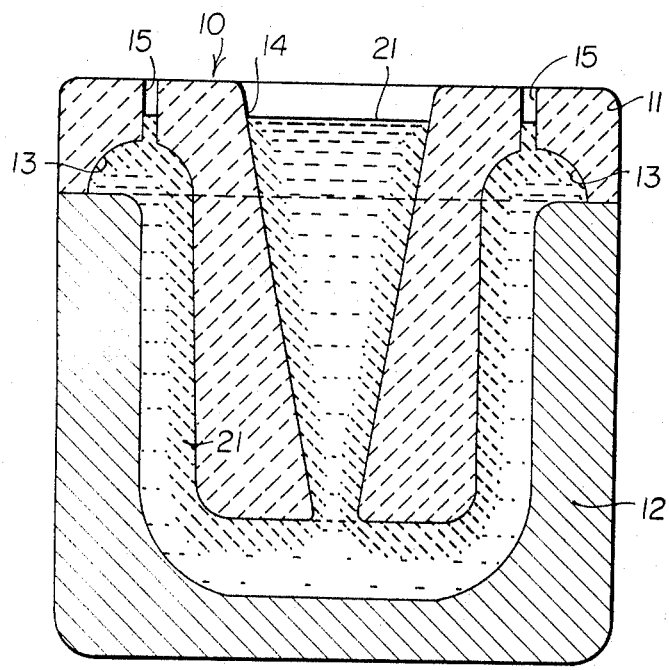
FIGURE 1 is a cross-sectional view of a mold constructed according to the invention and illustrates the manner in which the slip is solidified within this mold.

Referring first to FIG. 1, reference numeral 10 designates a mold for forming solid slip castings. The mold 10 comprises a male mold half 11 and a female mold half 12. In the illustrated construction, the mold halves 11 and 12 cooperate to provide an annular, cup-shaped cavity 13 for producing, as an illustrative product, a crucible; however, it is to be understood that the annular cavity of the mold can be configured to produce other desired shapes of ware. A gate 14 is formed in the center of the mold half 11, and vent and overflow holes 15 are provided in communication with the top of the annular cavity.

In accordance with the present invention, the inner mold half is shown as made of a porous material, such as a pottery plaster formed in any conventional manner; it is within the scope of this invention to use any other connected-cell porous material capable of absorbing the water or other suspending liquid from a cast slip or slurry and filtering out the solids therein to leave a de-liquified deposit upon the wall of the mold. The female mold half 12 is formed with a water-impervious casting surface. This may be accomplished by forming the female mold cavity of solid impervious material, such as metal, as shown, or by forming the cavity with an impermeable shell of metal, plastic, or other non-absorptive material (preferably inert to the liquid and solid phases of the slip) and supporting the shell in a material, the porosity or reactivity of which is then immaterial. An incidental advantage of either a solid or shell construction of metal or like inert material is that the greater initial cost often makes such molds far more economical than the molds of plaster or similar porous material conventionally used heretofore. As contrasted with conventional plaster molds which are leached out, eroded, and weakened by the absorbed liquid after a relatively few uses, a mold half made according to this invention made with an impermeable wall is substantially permanent; such mold parts will maintain their dimensions to close tolerances without the erosion which heretofore required the replacement of a mold part after a number of uses, even if it should survive normal breakage in handling and usage. However, where only a short or sample run is intended and conventional porous materials will provide the necessary strength for any pressure that may be involved, it is within the scope of this invention, and often highly practical, to make the mold of conventional porous materials and then impregnate about half the porous molding surfaces with paraffin, or impermeable varnish, or a plastic coating such as epoxy, polyurethane polysulfide (Thiokol), or a like inert plastic, so that, in general, the mold cavity is comprised of permeable and impermeable surfaces opposed to each other.

The casting process is effected by preparing a slip 21 of the appropriate composition and pouring a sufficient amount of the slip through the impervious gate 14 to fill the mold cavity 13 and the vent holes 15. A head of liquid slip is maintained in the gate 14 during casting so that, as the initial volume of slip in the cavity gradually solidifies by absorption of the suspending liquid, additional material will be supplied to take up that decrease in volume of the cast slip.

Inasmuch as the metal surface of the mold half 12 is impermeable, suspending liquid is removed from the slip only through the porous mold half 11. Therefore, as the casting progresses, a solidified layer of slip is first formed next to the porous mold surface 11, and the thickness of this layer gradually increases toward the water-impervious mold surface until the entire mass of slip has solidified. Since the solidification of the slip proceeds from only one surface of the cavity, the casting is, in effect, uni-directional as compared to conventional casting in which solidification occurs at both surfaces of the mold cavity.

Figure 2:
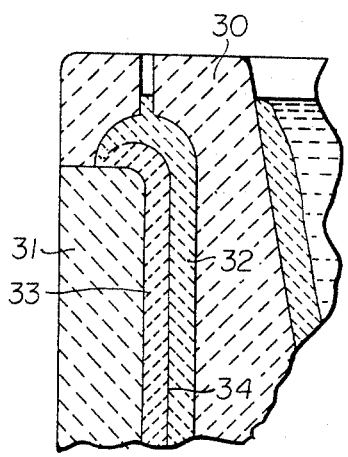
FIGURE 2 is a fragmentary, cross-sectional view illustrating the conventional molding practice.

FIGURE 2 is illustrative of the prior art practice in which water is removed from the slip through both the female and male mold halves 30 and 31. As generally discussed above, this results in initial solidification next to both mold surfaces and progressive removal of water from deeper in the slip. When the solidification proceeds to completion, the solid layers 32 and 33 are separated by the moist interface 34 which prevents the layers from completely fusing into a homogeneous mass. It is often this sharp line of demarcation or cleavage through the object which can be a primary cause of cracking during drying and firing of ceramic ware.

An important advantage which is gained by uni-directional casting according to this invention is that the slip solidifies in a substantially homogeneous mass, that is, there are no internal cleavage lines or surfaces formed by weakly fused or unfused ceramic particles. Although the moisture content of the initially solidified object progressively increases in the direction of the impervious molding surface, excess moisture may be removed by subsequent drying without affecting the soundness of the ware or setting up unbalanced internal stresses which may be a major cause of warping or drying and firing cracks in conventional cast articles. It is evident that green ware produced by this invention will not contain internal, undetectable portions of unsolidified and still fluid slip. If articles produced by this method should be removed from the mold before all of the slip therein has been solidified, any liquid slip will be readily evident on the surface; molding time, slip formulation, casting pressures, or the like, may be adjusted to eliminate what would be concealed and undetectable flaws in articles produced by conventional techniques.

In general, speed of casting may be increased by this invention, not only because the uniform density of the walls of the resultant product permits the casting of lighter, thinner walled articles, but also because the impermeable molding surface may often define one side of an effective conduit within the mold cavity permitting the flow of liquid slip from the sprue to all portions of the cavity as the suspending liquid is absorbed and withdrawn through the opposite permeable surface. Where sudden changes in section are required in the cast article and deposits in the thinner sections may block flow between the thicker sections, multiple sprues leading into the thicker sections are practical and less likely to create cleavage lines transverse to the wall surfaces of the cast article. Again, the tendency of the slip to lose its fluidity last at the impermeable surface permits the slip to flow and join sections supplied by different sprues (properly located).

In the illustrative mold shown, the outer wall surface is impermeable and the inner surface porous; obviously, it is within the scope of this invention to reverse this order, as well as to introduce the slip through a gate in an impermeable mold surface rather than through the porous surfaces, as shown. Likewise, according to this invention, molds having a greater number of parts than two may be, and often are, used to provide, as nearly as the required configuration of the article permits, substantially opposed permeable and impermeable surfaces so that the flow of removed suspending liquid, usually water, will be uni-directional away from the permeable surface and toward the permeable surface.

It is to be understood that, in following the method and using the apparatus as hereafter claimed, the slips or slurries to be cast may be introduced into and/or maintained in the mold cavities under pressures appropriate for (a) the composition of the slip or slurry being cast and/or (b) the shape of the part being produced and/or (c) the casting time permitted by production schedules and the mold filling and casting equipment being used. Such pressures may vary widely, from those just sufficient to fill the mold cavity to a desired level to pressures limited only by the capacity of the mold filling or the structural strength of the mold parts. It is also to be understood that, when the sprue or gate to this mold cavity is through a porous portion of the mold, one may use an impermeable coating on the sprue wall, a liner, or an injection nozzle to minimize or avoid (a) blocking the gate by solidified matter before the optimum solidification within the cavity; (b) loss of clay or other suspended solids by solidification on the sprue wall, and (c) decreasing the absorptive capacity of the permeable section of the mold and increasing mold drying time by the absorption of liquid through the wall of the sprue into the permeable mold part. For example, in the particular mold shown, it would be normal practice to varnish or otherwise coat the sprue and vent holes in the permeable mold half 11 to render their surfaces relatively impermeable.

Other modifications and variations of the invention will be apparent to those skilled in the art in view of the foregoing detailed disclosure. It is to be understood that, in the appended claims, and if the context is not to be contrary, the term "slip" includes suspensions, usually but not necessarily, in water of ceramic particles other than clay and that the mass of suspended particles brought to a relatively solid state by removal of the suspending liquid need not go through a plastic stage, as is customary in the dewatering of clay slips. Therefore, it is to be understood that within the scope of the appended claims, the invention may be practiced otherwise than as specifically shown and described.

What is claimed is:

1. A method of slip casting comprising providing porous bodies which cooperate to form a substantially closed mold cavity, rendering approximately one-half of the surfaces of said cavity impermeable and keeping said cavity filled with a slip until the cavity is filled with a relatively solidified cast mass of particles, said slip being cast by uni-directional solidification proceeding toward said impermeable surfaces.

2. A method of producing solid slip cast ceramic bodies comprising the steps of providing a mold having a hollow cavity with substantially opposed permeable and impeameable areas, introducing a liquid slip into said cavity through a gate therein, removing the suspending liquid from said slip through a permeable surface, introducing additional slip into said cavity to replenish the volume of the removed suspending liquid so as to cause the replenishing slip to remain more fluid and flow along an impermeable surface while building up a deposition of solids on the permeable surface until said cavity is substantially filled with a deposition of solids characterized by a substantially continually decreasing gradient of liquid content from an impermeable surface area to a permeable surface area and any residual fluid suspension in the cavity is adjacent an impermeable surface.

References Cited

UNITED STATES PATENTS

| 1,564,274 | 12/1925 | Rand | 25—156 X |
| 1,679,345 | 8/1928 | Austin | 25—156 X |
| 2,288,661 | 7/1942 | Wadman | 25—156 |
| 1,692,887 | 11/1928 | Casselman | 264—87 |
| 2,534,653 | 12/1950 | Austin | 264—312 |
| 1,337,663 | 4/1920 | Lawrence | 264—86 |
| 1,733,729 | 10/1929 | Gouuerneur | 264—86 |
| 1,891,476 | 12/1932 | Keller | 264—86 |
| 1,415,213 | 5/1922 | White | 25—129 |
| 1,534,155 | 4/1925 | Butler | 25—129 |

ROBERT F. WHITE, *Primary Examiner.*

G. AUVILLE, *Assistant Examiner.*